Figure 3:
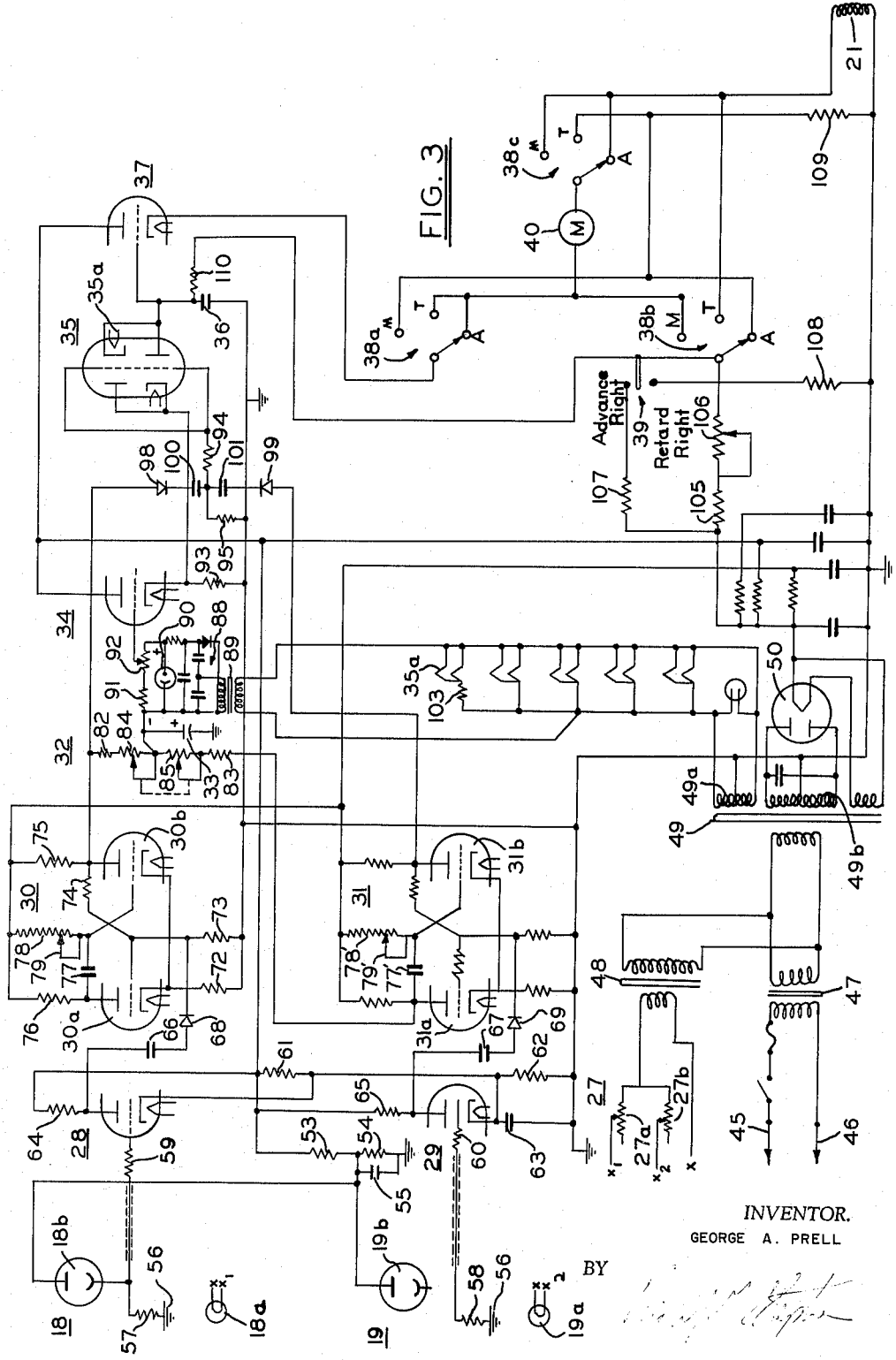

May 31, 1966      G. A. PRELL      3,254,300
CONTROL SYSTEM RESPONSIVE TO THE TIME INTERVAL BETWEEN EVENTS
Original Filed Jan. 12, 1959      3 Sheets-Sheet 1
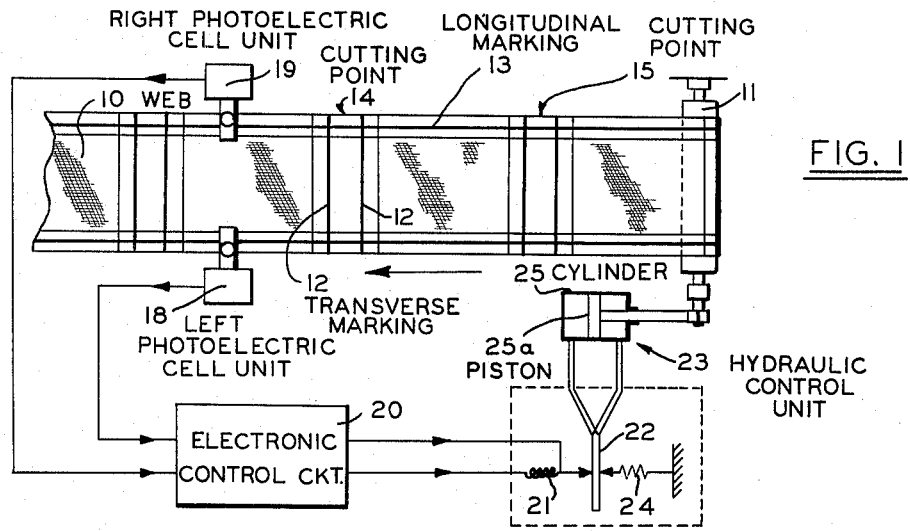
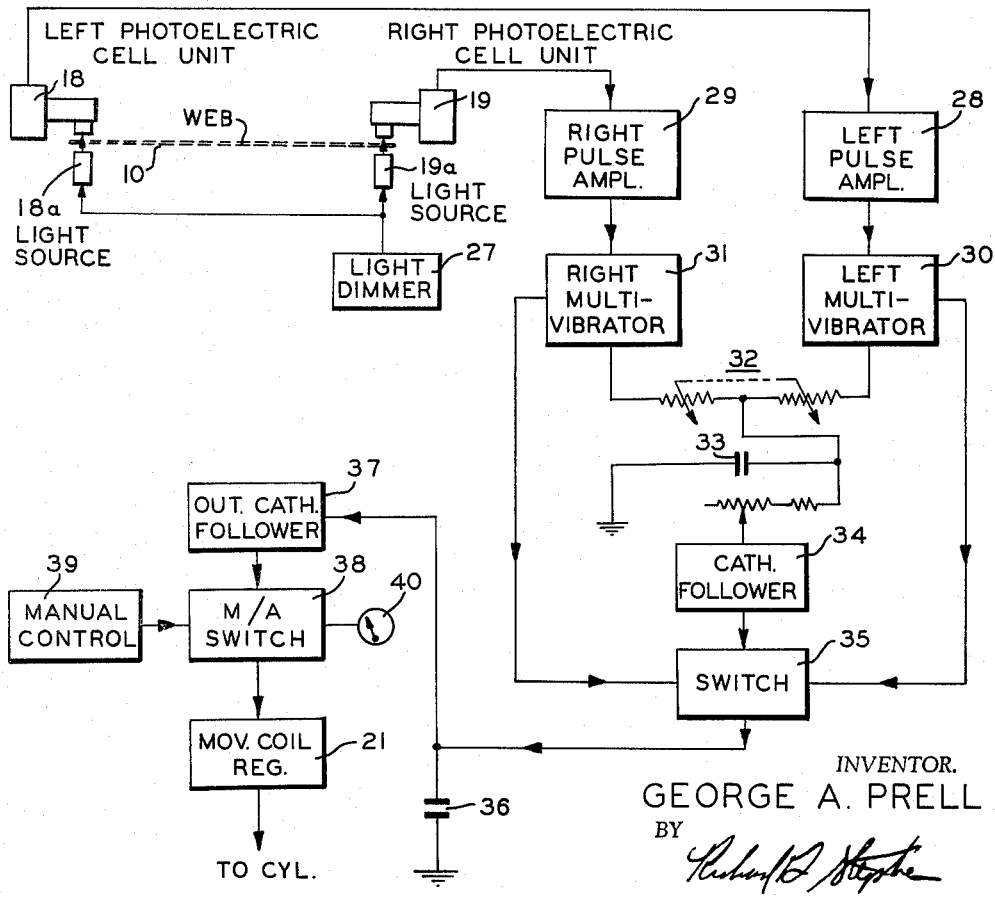
INVENTOR.
GEORGE A. PRELL

INVENTOR.
GEORGE A. PRELL

AMPLIFIER WAVE FORMS

United States Patent Office 3,254,300
Patented May 31, 1966

3,254,300
CONTROL SYSTEM RESPONSIVE TO THE TIME
INTERVAL BETWEEN EVENTS
George A. Prell, Itasca, Ill., assignor to GPE Controls,
Inc., a corporation of Illinois
Original application Jan. 12, 1959, Ser. No. 786,226, now
Patent No. 3,041,703, dated July 3, 1962. Divided
and this application Sept. 7, 1960, Ser. No. 54,522
13 Claims. (Cl. 324—68)

This application is a division of my application Serial No. 786,226, filed January 12, 1959, now U.S. Patent No. 3,041,703 granted July 3, 1962.

This invention relates to a control system and more particularly to a control system for measuring the difference in time of occurrence of two events and for establishing control potentials or signals to maintain the difference in time of occurrence of the events at a predetermined value.

A principal object of the invention is to provide a new and improved control system and circuitry having a high degree of accuracy and a short response time.

One feature of the invention is the provision in a sensing circuit of means for determining the relative time of two events, comprising means for deriving a control signal function of the time of occurrence of each event, a pair of monostable circuits connected with the control signal deriving means and actuated thereby, and means responsive to the output of the monostable circuits for indicating a time difference between the two events.

Another feature is that the circuit includes means for establishing an error signal as a function of the variation of a condition from a desired state, means actuated by the error signal for varying the state of such condition, and means for periodically sampling the error signal and for transmitting the sampled error signal to the signal actuated means. A further feature is that the system includes means for establishing a reference signal and the sampling means alternately samples the error signal and the reference signal and transmits such sampled signals to the signal actuated means.

Still another feature is that the monostable circuits are multivibrators having conductive and nonconductive sections with a load circuit connected between the conductive section of one and the nonconductive section of the other, with a capacitor connected to the resistive network, the capacitor's charge increasing when one of the multivibrators is triggered first and decreasing when the other is triggered first, establishing a varying control potential in accordance with the relative time of firing of the two multivibrators.

Yet a further feature is the provision in a control circuit of means for establishing an error signal as a function of the variation of the condition from a desired state, means for utilizing the error signal, and bias means interposed between the error signal establishing means and the utilizing means.

Still another feature is the provision in a control system of means for establishing an error signal as a function of a variation of a condition from a desired state, control means operable to return the condition to the desired state and including an actuating element responsive to a control signal, and means for alternately coupling the error signal and a reference signal to the actuating element.

Yet a further feature is the provision of a method for determining the relative time of occurrence of two events, comprising generating two signals in timed relation to the occurrence of the events, combining the signals and deriving a difference signal therefrom.

Figure 4:
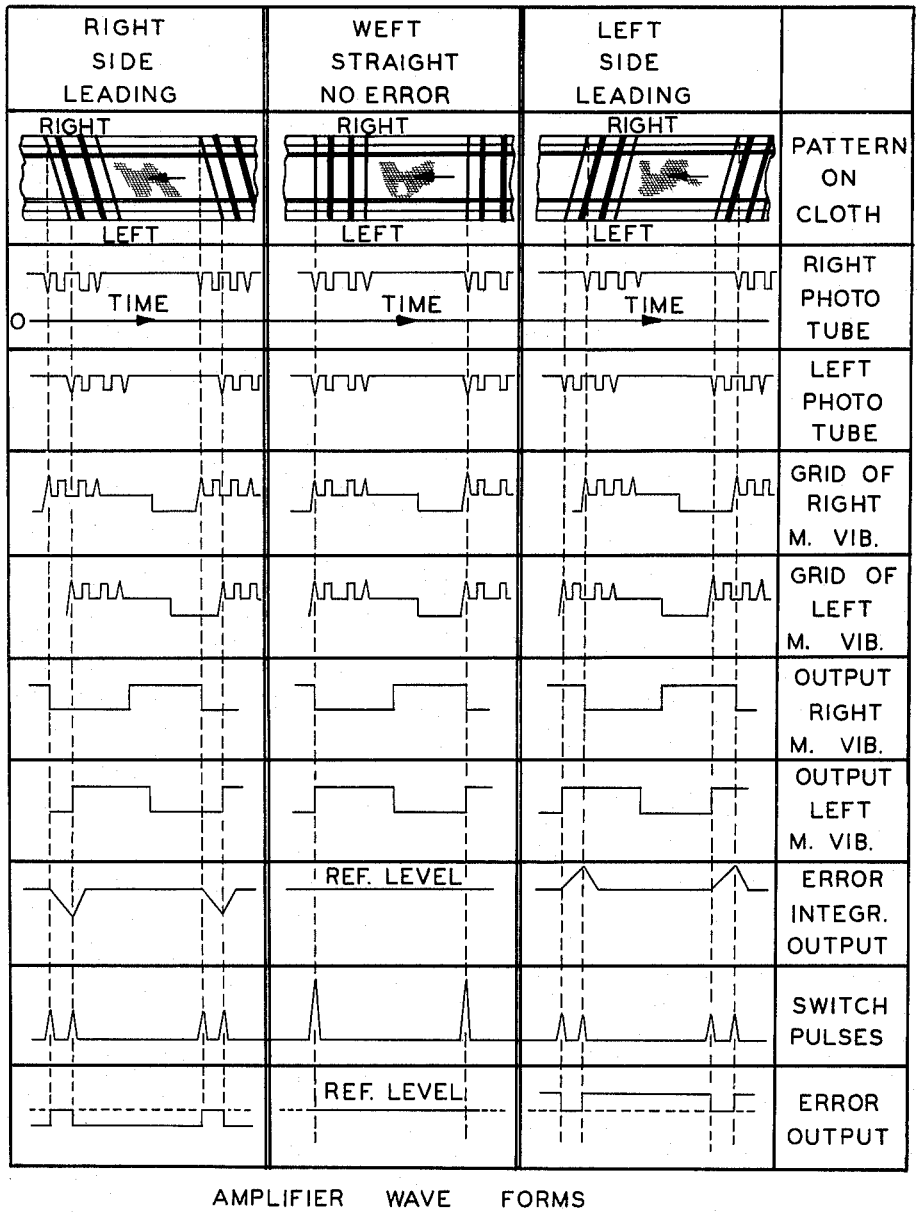

Other features and advantages will readily be apparent from the following specification and from the drawings, in which:

FIGURE 1 is a diagrammatic view of a system embodying the invention;
FIGURE 2 is a block diagram of a control system embodying the invention;
FIGURE 3 is a schematic diagram of a circuit embodying the invention; and
FIGURE 4 is a series of wave forms from various points in the circuit of FIGURE 3, indicating three different circuit conditions.

The invention as disclosed herein is embodied in a weft control system, that is a system which operates with a web of fabric material to keep the weft threads, or a transverse design on the web, properly aligned as the web passes through a handling mechanism, as a cutter. While the specific circuit disclosed is particularly adapted for such a system, the invention may have many other uses, as will readily be apparent.

In FIGURE 1, a web 10 of a woven fabric material is shown passing from right to left over control roller 11. The web 10 is imprinted with a suitable design, made up of transverse and longitudinal markings 12 and 13, respectively, and in this particular case is designed to be severed at points 14 and 15, forming handkerchiefs or the like. In cutting a woven fabric it is essential that the cut be made parallel with the weft threads which run generally at right angles to the length of the web. Accordingly, it is desirable that the weft threads be kept straight and at right angles to the web proper. Assuming that the transverse imprinting 12 is aligned with the weft threads, the control may be based upon this imprinting and so long as the imprinting is straight and at right angles to the web, the weft threads are properly oriented.

In the illustrated embodiment of the invention the condition of the web is sensed by a pair of photoelectric cell pickup units 18 and 19 aligned on the left and right sides of the web, respectively, which are actuated on the passage of transverse markings 12 and generate corresponding signals. The signals from the photocells are compared by electronic circuit 20 which establishes certain control signals that are coupled to control coil 21. Actuating member 22 of a hydraulic control unit 23 is urged in one direction by the flow of current in coil 21 and in the opposite direction by return spring 24. Actuating member 22 directs the flow of hydraulic fluid under pressure to a piston 25a and cylinder 25 which moves control roller 11 adjusting the angle of the weft threads of web 10.

Turning now to the block diagram of FIGURE 2, the photoelectric systems include a pair of light sources 18a and 19a mounted meneath the web 10 and transmitting light directly therethrough to the pickups 18 and 19. A light dimmer 27 controls the intensity of the light, and thus the level of the signals generated in photocell pickups 18 and 19, and may compensate, at least to a certain extent, for the thickness or density of web 10. In certain circumstances it may be necessary or desirable to use reflected light with the light sources mounted on the same side of the web as the pickup units. If the web has no suitable imprinting on it for generating the necessary signals, a comparable arrangement utilizing infrared light or the like may be utilized, as by imprinting infrared sensitive marks on the web, in a manner such that they are invisible to the naked eye.

The pulse signals generated by the photocell units when the transverse markings on the web pass them are transmitted through amplifiers 28 and 29 to left and right multivibrators 30 and 31 and trigger the multivibrators, which are of a one-shot or single cycle design. The outputs of the multivibrators are combined in a resistive network 32 and a control potential or signal appears across capacitor 33. The control signal is coupled through a cathode follower 34 to a bidirectional switch or gate 35. When the switch is operative capacitor 36 charges to a voltage which is directly related to the control voltage of capacitor 33. This control signal on capacitor 36 acts through output cathode follower 37 to establish the current flowing through control coil 21. A manual-automatic switch 38 provides for control of the coil current from a manual control 39 while the meter 40 indicates the amplitude of the coil current.

As will appear in the following detailed discussion of an embodiment of the circuit, a reference voltage and an error voltage both appear across capacitior 33 during a cycle of operation of the system. These voltages are periodically and alternately sampled and transmitted through switch 35, actuated by the gating pulses derived from the multivibrators 30 and 31 to control tube 37. Thus, the current through coil 21 is first established at a reference level and then, if an unbalance exists in the system, i.e. if the web is not straight, any error voltage is established which, when transmitted through switch 35 to capacitor 36, changes the level of current in coil 21.

Preferably, the reference level of the coil current is such that the hydraulic system actuating member 22 is maintained in its center position, with no flow of hydraulic fluid to the cylinder. When an unbalance exists, the actuating member 22 is moved in one direction or the other depending upon the nature of the unbalance causing the flow of hydraulic fluid to one side or the other of piston 25a in cylinder 25. The actuating member 22 assumes a fixed position in response to the level of the control signal and the piston moves continuously at a fixed rate during this period. When the next reference level signal is transmitted to capacitor 36, actuating member 22 returns to the neutral or central position and the motion of piston 25a stops, but it remains in its new position.

Turning now to FIGURE 3, a complete schematic diagram of the control circuit embodying the invention will be described, and values and type designations will be assigned to the various components. It is to be understood that the specific details are given for the purpose of providing a complete operative disclosure of the invention and many changes, modifications and substitutions will readily be apparent to those skilled in the art.

The control circuit may be energized by connecting terminals 45 and 46 to a suitable source of power, as 110 volts A.C. The secondary winding of power isolation transformer 47 has connected thereto a lamp energizing circuit including a step-down transformer 48 and individual light dimmer controls 27 to which the lamps 18a and 19a are connected. The light dimmers include variable resistors 27a and 27b, each 3 ohms, and may be adjusted to compensate for differences in the characteristics of the two photoelectric systems. A power transformer 49 is also energized from the secondary of isolation transformer 47 providing heater voltages for the various tubes of the circuit from secondary 49a and high voltage for rectifier 50, a 5Y3, from secondary 49b. A multiple section filter network is connected with rectifier 50 providing four separate B+ outputs, which are at least partially isolated from each other.

The photocells 18b and 19b, each a type 927, are energized from a voltage divider connected across one section of the B+ supply and including resistors 53, 82,000 ohms, and 54, 27,000 ohms, shunted by capacitor 55, 2$\mu$f (microfarads). The cathodes of the two photocells are returned to a reference potential or ground 56 through resistors 57 and 58, 10 megohms each. The output signals from the photocells are obtained across resistors 57 and 58, 10 megohms, and coupled through series resistors 59 and 60, 10 megohms, to the control grids of pulse amplifiers 28 and 29, each one-half of a 12AX7. The cathodes of the two pulse amplifiers are tied together and connected to a juncture of resistors 61, 82,000 ohms and 62, 3900 ohms, connected between B+ and ground. Resistor 62 is shunted by capacitor 63, 2$\mu$f. The amplified pulses are developed across load resistors 64 and 65, 270,000 ohms, and coupled through capacitors 66 and 67, 0.004$\mu$f, and diodes 68 and 69 to the monostable multivibrators 30 and 31.

Each of the multivibrators includes two sections 30a, 30b, 31a and 31b, each section being one-half of a 12AU7. In their normal state, i.e. in the absence of a pulse signal from photocell units 18 and 19, section 30a and 31a are nonconducting while sections 30b and 31b conduct. The circuits of the two multivibrators are identical, and only the left unit 30 will be described in detail. In describing and claiming the multivibrators the term output will be used to refer to points in those circuits at which useful signals are available, even though such signals are not used in carrying out the invention, this terminology being commonly used by those skilled in the art.

The cathodes of sections 30a and 30b of the left multivibrator 30 are returned to ground through a common unbypassed resistor 72, 8200 ohms. The control grid of section 30a is returned to ground through resistor 73, 180,000 ohms, which forms a voltage divider with resistor 74, 470,000 ohms, and resistor 75, 22,000 ohms, the plate load resistor of section 30b, connected to B+. The plate of section 30a is connected with B+ through load resistor 76, 22,000 ohms, and is coupled through capacitor 77, 0.15 $\mu$f, to the control grid of section 30b, which is in turn connected to B+ through a stepped resistance network 78, made up of a series of fixed resistors, with a switch 79 for selecting the portion of the resistors which are connected in the circuit.

When photocell unit 18 is actuated, a positive pulse from amplifier 28 is applied to the control grid of section 30a of the multivibrator driving it into conduction, whereupon the plate voltage drops to a low level. This negative pulse is transmitted through capacitor 77 to the control grid of section 30b, cutting it off and further increasing the positive potential level of the control grid of section 30a. Section 30a continues to conduct for a period of time determined by the time constant of capacitor 77 and resistance network 78. When the negative potential on the grid of section 30b is reduced to a point where section 30b again conducts, the voltage on the control grid of section 30a drops, cutting it off and returning the circuit to its original condition. Thus, a cycle of operation of the multivibrator results in simultaneous negative pulse at the plate of section 30a and a positive pulse at the plate of section 30b. The same action occurs in multivibrator 31.

The resistive load network 32 for multivibrators 30 and 31 includes fixed resistors 82 and 83, 270,000 ohms each, and ganged variable resistors 84 and 85, 10 megohms each. This network is connected between the plate of multivibrator sections 30b and 31a, i.e. the normally conducting section of left multivibrator 30 and the normally nonconducting section of right multivibrator 31. A composite output or control voltage from the multivibrators appears across capacitor 33 connected between the juncture of potentiometers 84 and 85 and ground. Assuming that the normal plate voltage of section 30b is 100 volts, while that of section 31a is 200 volts, a voltage of the order of 150 volts appears across capacitor 33.

Briefly, the operation of the circuit is as follows. If the two multivibrators are triggered at the same time, the voltage on the plate of section 30b shifts to 200 volts, while the voltage on the plate of section 31a drops to 100 volts and the voltage across capacitor 33 remains constant. If the left multivibrator 30 is triggered first, the voltage at the plate of section 30b rises to 200 volts and the voltage at the plate of section 31a is still 200 volts, the voltage across capacitor 33 tends to rise. Conversely, if right multivibrator 31 is triggered first the voltage at the plate of section 31a drops to 100 volts and the voltage across capacitor 33 tends to fall. The rate of change of the voltage of capacitor 33 depends upon the time constant of the circuit made up of the capacitor and resistance network 32. The relationship of the multivibrator firing times to the web control system of FIGURES 1 and 2 will be discussed in greater detail below.

The voltage across capacitor 33, which is of the order of 150 volts, is too great for easy handling in the remainder of the system. Accordingly, a voltage doubler connected rectifier system 88 is provided, energized through isolation transformer 89 from the filament supply winding 49a of power transformer 49. Voltage regulator 90, an OA2, maintains a constant 150 volts across a series combination of resistor 91, 220,000 ohms and variable resistor 92, 50,000 ohms. The setting of the tap on variable resistor 92 determines what portion of the difference between the voltage across capacitor 33 and that of the rectifier, is applied to the control grid of cathode follower 34. Rectifier system 88 and its associated circuitry present a high impedance to the circuit and are isolated from ground, so that they do not effect the time constant of the circuit of capacitor 33. The output of cathode follower 34 is developed across cathode resistor 93, 10,000 ohms, and is substantially the same as the potential that appears at the control grid.

Bidirectional switch for gate 35 comprises both halves of a dual triode 12AX7 having the plate and cathode elements of the two sections reversely connected, i.e. the plate of one section is connected to the cathode of the other while the cathode of the first is connected to the plate of the second, and the grids are connected together. One pair of the plate-cathode elements is connected to the cathode of cathode follower 34, while the storage element or capacitor 36 of the output control circuit is connected to the other pair of elements. Thus, the switch, when operative conducts current from cathode follower 34 to capacitor 36 or vice versa depending upon which element has the higher potential. The grid elements of switch 35 are connected through resistors 94, 1 megohm and 95, 330,000 ohms, to ground. With this circuit both sections of the switch are normally nonconductive. However, positive trigger pulses are obtained from the plates of the second sections, 30b and 31b of the two multivibrators and are coupled through diodes 98 and 99 and capacitors 100 and 101, 0.002 μf each, to the juncture of resistors 94 and 95. Thus, the switch 35 is rendered conductive or operative when each of the multivibrators is triggered, and a positive voltage pulse is produced at the plate elements of sections 30b and 31b. When the switch is operative, the voltage in the output of cathode follower 34, which is determined by the voltage across capacitor 33, is applied to capacitor 36. This capacitor is in the circuit of the control grid of output tube 37, one-half of a 12AT7 and its voltage establishes the amplitude of current flow through tube 37 which is maintained until the next trigger pulse causes a change in the level of the voltage on capacitor 36. The heater element 35a of switch tube 35 is connected with the filament supply winding of the power transformer through resistor 103, 10 ohms, to increase the isolation of the switch tube from ground, providing sufficient impedance in this state for satisfactory operation.

With the manual automatic switch 38, which has three sections 38a, 38b and 38c, set to the automatic position or "A" position, as shown in the drawing, the cathode circuit of output stage 37 is completed through switch section 38a, meter 40, switch section 38c and control coil 21 for the actuating member 22 of the hydraulic piston and cylinder device.

The operation of the control circuit in the system of FIGURES 1 and 2 will now be considered and related to the wave forms for the various portions of the circuit illustrated in FIGURE 4. Presuming that the web 10 is not skewed and that the weft threads and imprinted indicia 12 are at right angles to the web, both photocell units 18 and 19 are actuated or triggered simultaneously, center column—FIGURE 4. This actuation or triggering, in the illustrated system, takes the form of a decrease in current through the photocells 18b and 19b, as the main body of the web is normally of a lighter colored material than the design 12. Thus, a negative pulse appears across resistors 57 and 58 upon travel of the indicia past the photocell units. As indicated in FIGURE 4, where there are a series of indicia marks on the web, as at the edge of a handkerchief, a corresponding series of pulses are produced by the photocell units, but in this situation they occur at identical times in the two units. These series of pulses appear with the positive direction at the grids of the sections 30a and 31a of the multivibrators. The leading edge of the first pulse of each series triggers the multivibrator, here both at once, causing sections 30a and 31a to conduct and cutting off sections 30b and 31b, as explained above. The outputs of the two multivibrators, i.e. a positive pulse from section 30b of the left multivibrators and the negative pulse from the section 31a of the right multivibrator are simultaneously applied to the resistive load network 32, and the level of the control voltage across capacitor 33 does not change from the reference level. The switching pulses, derived from sections 30b and 31b of the multivibrators, likewise occur at the same time and render switch 35 conductive so that the reference voltage is communicated to and appears across capacitor 36. This results in a flow of current through output tube 37 and thus through coil 21, which produces a force balancing the force of return spring 24 and centering actuating member 22.

For a condition with the right side of web 10 leading, the wave forms and time relationships in the circuit are illustrated in the left column, FIGURE 4. The right phototube 19b is actuated before left phototube 18b by a time interval determined by the amount of lead of the right side of the web and the speed of the web. Thus, the right multivibrator is triggered before the left multivibrator is triggered. With the triggering of the right multivibrator, the first result is the production of a switch pulse at the plate of section 31b which renders switch 35 conductive. At this instant, the voltage appearing across capacitor 33 is the standard or reference voltage for the system, here of the order of 150 volts. This reference control voltage is transmitted to capacitor 36 and, if valve member 22 had previously been displaced, it is returned to its central position. The charge on capacitor 33 begins to decrease toward the 100 volt level at a rate determined by the time constant of the multivibrator output circuit, and when the left multivibrator is triggered, the amplitude of the voltage appearing across capacitor 33 indicates the length of time between the triggering of the two multivibrators, and thus the error in alignment between the right and left sides of the web. As the left multivibrator is triggered, a switching pulse from plate of section 30b actuates switch 35 transferring this lesser voltage from capacitor 33 to capacitor 36, reducing the flow of current through tube 37 and coil 21. This allows the return spring 24 to move actuating member 22 to the right introducing hydraulic fluid to the right side of piston 25a and moving the lower end of roller 11 (as viewed in FIGURE 1) to the left, tending to move the left side of the web forward and compensating for the unbalance indicated by the earlier triggering of the right multivibrator. The right multivibrator completes its cycle and returns to its original condition, and a short time thereafter, the left multivibrator completes its cycle. At this point the voltages applied to multivibrator load network 32 reestablish the reference voltage across capacitor 33, ready to be transmitted to capacitor 36 upon the initiation of the next cycle.

Many border designs are made up of more than one element, here shown as a series of parallel lines, and it is important that the periods of the two multivibrators be long enough that they are triggered only by the first element of each group. As illustrated in FIGURE 4, there are four trigger pulses from the pulse amplifiers, corresponding with the four lines of the design, and the cycle or time period of the multivibrators must be such that it is longer than the period of time required for these four lines to pass the photoelectric cell pickup units. This time is controlled by the portion of resistive network 78, and the corresponding network 78' of multivibrator 31, which is in the circuit of capacitor 77 and its corresponding capacitor 77'. These resistive networks, which are made up of a series of fixed and matched resistances, with switches 79 and 79' ganged for simultaneous, equal operation so that the periods of the two multivibrators are substantially identical. It is impractical to utilize ganged potentiometers for this purpose as carbon resistor potentiometers which could achieve the resistance values necessary cannot be matched with sufficient accuracy, and wire wound potentiometers, which can be matched, cannot achieve the necessary resistance levels.

In the third column of FIGURE 4, the circuit conditions for the left side of the web leading, are shown. The signal for the left phototube is applied to the grid of the nonconducting stage of left multivibrator 30 triggering it and simultaneously actuating the switch tube 35 to transmit the reference level voltage from capacitor 33 to storage capacitor 36 in the output circuit. The potential of capacitor 33 rises until the right multivibrator is triggered whereupon the increased potential is transmitted through the switch 35 to the control circuit storage capacitor 36, increasing the current through coil 21 and moving the lower end of roller 11 to right.

In the manual or M position of switch 38, control coil 21 is connected through sections 38b and 38c of the selector switch and resistive network, with B+. The resistive network includes resistor 105, 33,000 ohms, and potentiometer 106, 50,000 ohms. Manual control switch 39 may be actuated to a first position shunting resistors 105 and 106 with resistor 107, 150,000 ohms, or a second position shunting the coil 21 with resistor 108, 12,000 ohms. In the first position of switch 39, the current through control coil 21 is increased, advancing the right side of the web while in the second position the coil current is reduced advancing the left side of the web, retarding the right side. Potentiometer 106 is adjusted with switch 39 in its center position, as illustrated, to provide a coil current which exactly balances the force of spring 24, corresponding with a no error condition in the web. With switch 38 in the manual position the circuit of output control tube 37 is completed through a dummy load resistor 109, 4,700 ohms.

In the test or T position of switch 38, the coil 21 is connected with the manual control switch 39, while the meter 40 is connected in the circuit of output control tube 37. Thus, the travel of the web may be controlled manually while noting the response to the circuit on the meter, to make sure that it is operating properly. The control tube and meter circuit is completed through dummy load resistor 109.

A high resistance connection is made through resistor 110, 44 megohms, between the fixed reference potential and capacitor 36. This is desirable to prevent drift in the potential on the capacitor 36 in the event the system is placed in a stand-by condition for a substantial period of time.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a sensing circuit, means for determining the relative time of two events, comprising: means for deriving a signal at the time of occurrence of each event; a pair of multivibrator circuits connected with said means, each circuit having a conducting and a nonconducting section, the sections of one of said multivibrator circuits being actuated by a respective one of said signals to reverse the conditions thereof for a predetermined period, the sections of the other of said multivibrator circuits being actuated by the other of said signals to reverse the conditions thereof for a predetermined period; a load circuit connected between the conducting section of one multivibrator circuit and the nonconducting section of the other multivibrator circuit; a capacitor connected between a portion of said resistance load network and a reference potential, the charge on said capacitor shifting in one direction when one of said events occurs first and shifting in the other direction when the other of said events occurs first, the resultant shifting of the charge in either of said directions being operative as a control signal; control signal actuated means for varying the relative time of said two events, and including a storage element; bidirectional switching means for transmitting said control signal to the storage element of said control signal actuated means; and means for periodically actuating said switching means.

2. In a sensing circuit, means for determining the relative time of two events, comprising: means for deriving a signal at the time of occurrence of each event; a pair of multivibrator circuits connected with said means, each circuit having a conducting and a nonconducting section, the sections of each multivibrator circuit being actuated by a respective one of said signals to reverse the conditions thereof for a predetermined period; a load circuit connected between the conducting section of one multivibrator circuit and the nonconducting section of the other multivibrator circuit; a capacitor connected between a portion of said load circuit and a reference value, the potential across said capacitor shifting in one direction from said reference value when one of said events occurs first and shifting in the other direction when the other of said events occurs first, said reference value operable as a reference potential and the shift in potential across said capacitor operable as an error potential; signal actuated means for varying the relative time of occurrence of said events, and including a storage element; constant potential level-shifting means interposed between said capacitor and said signal actuated means for reducing the level of said reference potential only; means for periodically alternately sampling said error and reference potentials and including bidirectional switching means for periodically transmitting said sampled signal to the storage element of said signal actuated means; and means for periodically actuating said switching means.

3. In a control system: means for generating an error signal as a function of the variation of a condition from a desired state; control means operable to return said condition to the desired state, including a piston and cylinder having a control valve with an actuating device responsive to said error signal; a reference signal; and means for alternately coupling said error signal and said reference signal to said actuating device.

4. The method of controlling the relative time of occurrence of two events, comprising: generating first and second signals of a first magnitude and third and fourth signals of a second magnitude in timed relation to said occurrences, said first magnitude being greater than said second magnitude; combining one of said first and second signals with one of said third and fourth signals; and deriving from said combined signals a difference signal representing the difference in time of the two signals; periodically sampling said difference signal; and controlling the occurrence of said events in accordance with the samples of said difference signal.

5. The method of controlling the relative time of occurrence of two events, comprising: generating first and second signals of a first magnitude and third and fourth signals of a second magnitude in timed relation to said occurrences, said first magnitude being greater than said second magnitude; combining one of said first and second signals with one of said third and fourth signals; and deriving from said combined signals a difference signal representing the difference in time of the two signals; alternately sampling said difference signal and a reference signal; and controlling the occurrence of said events in accordance with each such sampled signals until the next sample is taken.

6. In a sensing circuit, means for determining the relative time of first and second events, comprising: means for deriving a first signal at the time of occurrence of said first event; means for deriving a second signal at the time of occurrence of said second event; first and second monostable multivibrator circuits each providing a normally OFF and a normally ON signal when in the quiescent state; means coupling said first and second signals to said first and second monostable multivibrators, respectively, to reverse the conditions thereof for a predetermined time interval; a load circuit; means coupling said load circuit between the normally OFF signal provided by one of said monostable multivibrators and the normally ON signal provided by the other of said monostable multivibrators to generate a reference potential in the absence of both of said first and second signals; said load circuit being further responsive to the outputs of said monostable multivibrator circuits for indicating the time difference between said first and second events.

7. In a sensing circuit, means for determining the relative time of first and second events, comprising: means for deriving a signal at the time of occurrence of said first event; means for deriving a signal at the time of occurrence of said second event; first and second multivibrator circuits each providing a normally OFF and a normally ON signal when in the quiescent state; means coupling said first and second signals to said first and second multivibrators, respectively; and means responsive to said normally ON signal and said normally OFF signal provided by said first and second multivibrators for indicating the time difference between said first and second events.

8. In a sensing circuit, means for determining the relative time of first and second events, comprising: means for deriving a first signal at the time of occurrence of said first event; means for deriving a second signal at the time of occurrence of said second event; first and second multivibrator circuits each providing a normally OFF and a normally ON signal when in the quiescent state; means coupling said first and second signals to said first and second multivibrators, respectively; a resistance network interconnecting the normally OFF output signal provided by one of said multivibrators with the normally ON output signal provided by the other of said multivibrators; and a capacitor connected between a portion of said resistance network and a reference potential, the charge on said capacitor shifting in one direction when one of said events occurs first and shifting in the other direction when the other of said events occurs first.

9. In a control system: means for deriving a first signal at the time of occurrence of a first event; means for deriving a second signal at the time of occurrence of a second event; first and second multivibrator circuits each providing a normally OFF and a normally ON signal when in the quiescent state; means coupling said first and second signals to said first and second multivibrators, respectively; means for establishing an error signal as a function of the relative time of occurrence of said first and second signals including a resistance network connected between the normally OFF signal provided by one of said multivibrators and the normally ON signal provided by the other of said multivibrators; error signal actuated means for varying the relative time of occurrence of said first and second signals; and means for periodically sampling said error signal and for transmitting the sampled error signal to said error signal actuated means.

10. In a sensing circuit, means for determining the relative time of first and second events, comprising: means for deriving a signal at the time of occurrence of said first event; means for deriving a signal at the time of occurrence of said second event; first and second monostable multivibrator circuits each providing a normally OFF and a normally ON signal when in the quiescent state; means coupling said first and second signals to said first and second multivibrators, respectively; a resistive network connected between the normally OFF output signal provided by one of said multivibrators and the normally ON output signal provided by the other of said multivibrators operable to generate a reference signal in the absence of both of said first and second signals and to generate an error signal as a function of the variation of the time of occurrence of said first and sceond events from a predetermined relationship; signal actuated means for varying the relative time of occurrence of said events, and including a storage element; means for periodically alternately sampling said error and reference signals and including bidirectional switching means for periodically transmitting said sampled signal to the storage element of said signal actuated means; and means for periodically actuating said switching means.

11. In a sensing circuit, means for determining the relative time of first and second events, comprising: means for deriving a first signal at the time of occurrence of said first event; means for deriving a second signal at the time of occurrence of said second event; first and second monostable multivibrator circuits each providing a normally OFF and a normally ON signal when in the quiescent state; means coupling said first and second signals to said first and second multivibrators, respectively; a resistance network including first and second variable resistors serially coupled and interconnecting the normally OFF signal provided by one of said multivibrators with the normally ON signal provided by the other of said multivibrators; a capacitor connected between the junction of said first and second resistors of said resistance network and ground, the potential across said capacitor shifting in value in one direction from a reference valve when one of said events occurs first and shifting in value in the other direction when the other of said events occurs first; signal actuated means for varying the relative time of occurrence of said events, and including a storage element; and means responsive to said multivibrator circuits for periodically alternately sampling said shifted and reference values and including bidirectional switching means for periodically transmitting said sampled value to the storage element of said signal actuated means.

12. In a sensing circuit, means for determining the relative time of first and second events, comprising: means for deriving a first signal at the time of occurrence of said first event; means for deriving a second signal at the time of occurrence of said second event; first and second multivibrator circuits each having a normally conducting section for providing an ON signal and a normally nonconducting section for providing an OFF signal when in the quiescent state; means coupling said first and second signals to said first and second multivibrators, respectively, each of said first and second signals operable to reverse the conditions of its associated multivibrator for a predetermined period; a load circuit connected between the normally conducting section of one multivibrator circuit and the normally nonconducting section of the other multivibrator circuit; and a capacitor connected between a portion of said load circuit and a reference potential, the charge on said capacitor shifting in one direction when one of said events occurs first and shifting in the other direction when the other of said events occurs first.

13. In a sensing circuit, means for determining the relative time of first and second events, comprising: means for deriving a first signal at the time of occurrence of said first event; means for deriving a second signal at the time of occurrence of said second event; first and second multivibrator circuits each providing a normally OFF and a normally ON signal when in the quiescent state; means coupling said first and second signals to said first and second multivibrators, respectively; a resistance network interconnecting the normally OFF signal provided by one of said multivibrators with the normally ON signal provided by the other of said multivibrators; a capacitor connected between a portion of said resistance network and ground, the charge on said capacitor shifting in one direction from a reference potential established by said multivibrators in the quiescent state when one of said events occurs first and shifting in the other direction when the other of said events occurs first; means for utilizing the shifting of the charge on said capacitor as an error signal; and constant potential level-shifting means interposed between said capacitor and said utilizing means for reducing only the level of said reference potential.

References Cited by the Examiner

UNITED STATES PATENTS

| | | | |
|---|---|---|---|
| 2,106,611 | 1/1938 | La Pierre | 26—51.5 |
| 2,495,684 | 1/1950 | Bartles | 328—207 |
| 2,530,631 | 11/1950 | Rich | 324—68 |
| 2,840,722 | 6/1958 | Frommer | 250—219 |
| 2,972,794 | 2/1961 | Saul et al. | 250—219 X |
| 3,009,107 | 11/1961 | Aspden | 324—83 |
| 3,043,153 | 7/1962 | Hindle | 226—21 |
| 3,090,534 | 5/1963 | Frommer | 250—219 |

OTHER REFERENCES

"A Recording Tachometer for Measuring Instantaneous Angular Speed Variations," S. P. Bartles Electrical Engineering, September, 1951.

WALTER L. CARLSON, *Primary Examiner.*

LLOYD McCOLLUM, FREDERICK M. STRADER, *Examiners.*

J. B. MILSTEAD, C. W. HOFFMANN, M. J. LYNCH, *Assistant Examiners.*